United States Patent [19]
Witham et al.

[11] Patent Number: 5,302,149
[45] Date of Patent: Apr. 12, 1994

[54] BONING METHOD AND APPARATUS

[75] Inventors: William J. Witham, 28 Cavell Road, Birkdale, Queensland 4159; Russel J. Rankin, Clear Mountain; Andrew M. Leiner, Sunnybank; Darryl J. Heidke, Morningside; Richard J. Gibbons, Cannon Hill; Edward G. Mills; Paul A. Green, both of Wilston; Matthew Aqualini, Mt Gravatt; John W. Buhot, Coorparoo; Phillip R. Boyce, Tingalpa; Andrew L. Finney, Marsden, all of Australia

[73] Assignees: William John Witham, Queensland; Scientific & Industrial Research Commonwealth Organisation, Australian Capital Territory; Meat Research Corporation, Sydney, all of Australia

[21] Appl. No.: 965,242
[22] PCT Filed: Apr. 29, 1991
[86] PCT No.: PCT/AU91/00172
§ 371 Date: Jan. 21, 1993
§ 102(e) Date: Jan. 21, 1993
[87] PCT Pub. No.: WO92/01385
PCT Pub. Date: Feb. 6, 1992

[30] Foreign Application Priority Data
Jul. 23, 1990 [AU] Australia .................... PK 1316

[51] Int. Cl.$^5$ .................................. A22C 17/00
[52] U.S. Cl. ............................. 452/135; 452/138
[58] Field of Search ............ 452/135, 138, 149, 160, 452/136, 166

[56] References Cited
U.S. PATENT DOCUMENTS

| | | | |
|---|---|---|---|
| 3,130,445 | 4/1964 | Segur | 452/135 |
| 3,531,825 | 10/1970 | Segur et al. | 452/149 |
| 4,480,353 | 11/1984 | Martin et al. | 452/166 |
| 4,993,113 | 2/1991 | Hazenbroek | 452/136 |
| 5,102,369 | 4/1992 | Martin et al. | 452/135 |
| 5,173,077 | 12/1992 | van den Nieuwelaar et al. | 452/135 |
| 5,197,918 | 3/1993 | Klaassen | 452/135 |

FOREIGN PATENT DOCUMENTS

0121477A1 10/1984 European Pat. Off. .
0300940A1 1/1989 European Pat. Off. .
1488051 10/1977 United Kingdom .

Primary Examiner—Willis Little
Attorney, Agent, or Firm—Lowe, Price, LeBlanc & Becker

[57] ABSTRACT

A boning process and apparatus for separating meat and bone, particularly ribs, in an animal carcass. The spine (12) is restrained relative to the ribs (16) and which are moved in an arc (A) so as to dislocate the joints (17) and to sever connective tissue. This exposes the ribs (16) at the dislocated joints (17) and the exposed ends (16a) are moved along a line (B or C) to progressively extend the exposed portions (16a) so as to separate a major part of each rib (16) from tissues (20) remaining attached to the spine (12). Cuts (21, 22) are formed in the tissues adjacent to the spine (12) and adjacent to the joint (17) to assist in exposing the ribs (16). The apparatus includes a support structure (50) including a base (51) and a spine support (52) for supporting the thoracic portion (10) and being movable towards and away from the base (51), the restraining means (30) for the spine (12) being mounted to the spine support (52) so as to be movable together with the spine support (52) and the thoracic portion (10) supported thereby. Rib moving means (55) are mounted to the base (51) to initially move the ribs (16). Movement of the spine support (52) away from and towards the base (51) effects further rib movements.

26 Claims, 4 Drawing Sheets

BONING METHOD AND APPARATUS

This invention relates to boning of carcasses and particularly though not exclusively to the boning of beef carcasses.

A manual operation is presently used in the meat industry to bone beef carcasses. The carcass is usually split into two sides or four quarters and each side is suspended from a hook on a carriage which travels along a rail so that the side hangs generally vertically. The boning operation is carried out by operators working on the suspended sides as they travel along the rail.

The technique of boning involves the use of a hook which is used with one hand to hold and position the side as desired. The operator uses a relatively short bladed boning knife which is used for separating the various cuts of meat from the suspended side by cutting the meat from the bones and from other cuts of meat. This operation of manually cutting the meat from the side can leave substantial amounts of meat attached to the side. Even though this meat can be recovered as scrap cuttings, such scrap cuts of meat attract only a very low price.

Furthermore, the use of the manual operation means that the labour costs add substantially to the total cost of the boning operation.

It is an object of the present invention to provide a boning process and a boning apparatus which enable recovery of a larger proportion of meat from a carcass or from other smaller portions of a carcass.

It is a further and preferred object of the present invention to provide a boning apparatus for recovery of meat from a carcass or from a smaller portion of a carcass which can be operated at least partially automatically.

According to the present invention there is provided a boning process for separating meat and bone in an animal carcass or in a portion of an animal carcass, the process being characterised by the steps of: restraining a first one of two bones meeting at a joint so that the first bone is restrained relative to the other second one of the two bones; moving the second bone relative to the first bone in a direction so as to dislocate the joint; exposing the second bone at or in close proximity to the dislocated joint; and moving the second bone relative to the restrained first bone to progressively extend the exposed portion of the second bone along the length of the second bone so as to thereby separate at least a major part of the second bone from tissues remaining attached to the restrained first bone.

The step of relatively moving the second bone to dislocate the joint preferably comprises a pivoting movement of the second bone about the joint beyond the normal limit of jointed movement between the two bones. Preferably the dislocating movement is continued beyond the point of the dislocation occurring so as to separate the joint end of the second bone from the region of the joint and facilitate access to the joint end of the second bone for effecting the step of exposing the second bone at that joint end.

The step of exposing the second bone at the dislocated joint preferably comprises a pivoting movement of the second bone about the joint and in a general plane of the movement until the joint end of the second bone at the dislocated joint emerges through the adjacent tissues to thereby expose that joint end of the second bone. In this embodiment, the step of exposing the joint end of the second bone preferably includes relatively moving the second bone in a general linear movement along the general line of the second bone, the linear movement being effected after dislocation of the joint, the linear movement moving the joint end of the second bone past the restrained first bone to thereby cause the joint end of the second bone to emerge through the adjacent tissues.

The step of exposing the second bone may include the step of forming at least one cut in the connective tendon between the second bone and adjacent to the joint so as to thereby expose or assist in the exposing of the second bone.

The step of separating the second bone preferably comprises relatively moving the exposed end of the second bone away from the dislocated joint so as to thereby cause progressive separation of the second bone from the tissues remaining attached to the first bone, the progressive separation commencing from the exposed end of the second bone.

In the process in which the step of exposing the second bone comprises linearly moving the second bone past the joint after dislocation, the step of separating the second bone may comprise continuing to relatively move the second bone generally linearly along the general line of the second bone so as to progressively separate the second bone from the tissues remaining attached to the restrained first bone. In this possible embodiment, the step of separating the second bone preferably comprises relatively pushing the second bone past the dislocated joint so that the tissues remaining attached to the restrained first bone progressively peel away from the second bone as it is moved.

In an alternative possible embodiment, the step of separating the second bone may comprise relatively pulling the second bone at the exposed end thereof away from the restrained first bone in a direction transverse to the general line of the second bone. In this embodiment, the step of separating the second bone may comprise gripping the exposed end of the second bone and subsequently relatively moving the gripped end away from the restrained first bone so as to cause a peeling of the tissues remaining attached to the first bone away from the second bone.

The process may be particularly arranged for separating ribs from the spine at the thoracic portion of an animal carcass or a portion of an animal carcass, the thoracic portion having been processed so that the brisket has been split, the hide removed and at least the thoracic portion eviscerated, the thoracic portion including both left and right side sets of ribs; the step of restraining comprising restraining the spine of the thoracic portion, the step of moving comprising engaging and moving the ribs at both sides of the carcass portion outwardly and generally in an arc about the restrained spine to dislocate the joints where the ribs connect to the spine.

According to the present invention there is also provided a boning apparatus for use in separating bones from animal carcasses or portions of animal carcasses, the apparatus comprising: restraining means for restraining a first one of two bones meeting at a joint so that the first bone is restrained relative to the other second one of the two bones; moving means for moving the second bone relative to the first bone in a direction so as to dislocate the joint, the second bone being exposed at or in close proximity to the dislocated joint, and the moving means being operative to move the second bone relative to the restrained first bone to progressively extend the exposed portion of the second bone along the length of the second bone so as to thereby separate at least a major part of the second bone from tissues remaining attached to the restrained first bone.

The moving means is preferably operative to move the second bone with a pivoting movement about the joint beyond the normal limit of jointed movement so as to dislocate the joint. The moving means may include engaging means for engaging the second bone at a free end thereof remote from the joint, the engaging means being operative to move the free end in an arc generally about the joint. The engaging means may comprise clamping means having clamping jaws which are movable relatively towards and away from each other so as to selectively clamp the free end of the second bone, the clampling means being movably mounted so as to move the free end of the second bone in an arc generally about the joint.

In an alternative possible embodiment of the apparatus, the moving means may comprise pushing means, the pushing means being arranged to engage with the tissues and/or second bone at a free end thereof remote from the joint and to push the free end so as to move that end in an arc generally about the joint. In this embodiment, the pushing means may comprise a pushing arm mounted for pivoting movement about a pivot axis which in use is located in the general vicinity of the joint, the free end of the pushing arm having contact means for contacting the tissues and/or second bone at the free end thereof, the contact means forming a rolling contact with the tissues and/or bone so that as the pushing arm is moved to push the second bone about the joint, the contact means rolls along the surface of the tissues and/or second bone.

The boning apparatus may further include a cutting means operative prior to or during the dislocating movement to form a cut in the connective tendor between the second bone and the first bone so as to thereby expose or assist in the exposing of the second bone.

The boning apparatus may be particularly arranged for separating ribs constituting the second bones from the spine constituting the first bone at a thoracic portion of an animal carcass or a portion of an animal carcass, the thoracic portion having been processed so that the brisket has a longitudinal cut, the hide removed and at least the thoracic portion eviscerated, the thoracic portion including both left and right side sets of ribs and the restraining means being operative to restrain the spine of the thoracic portion, the moving means being operative to move the ribs at both sides of the thoracic portion outwardly and generally in an arc about the restrained spine.

Preferably the moving means is operative to move all ribs on both sides of the thoracic portion simultaneously.

The restraining means may be operative to restrain the spine of the thoracic portion and may comprise a dorsal restraint to engage and locate against movement the dorsal side of the spine and a ventral restraint to engage and clamp the spine so that the dorsal and ventral restraints together restrain the spine against movement during the boning operation. In this embodiment, the dorsal restraint is preferably operative to engage with the spine on both sides of the feather bones along the dorsal side of the spine and to apply restraining force acting from both sides of the feather bones and generally towards the vertebra.

The apparatus may include a support structure for supporting the thoracic portion, the support structure having the restraining means mounted thereto so that the restraining means is operative to restrain the spine of the thoracic portion against movement relative to the support structure, the support structure including a base and a spine support for supporting the thoracic portion and being movable towards and away from the base, the restraining means being mounted to the spine support so as to be movable together with the spine support and the thoracic portion supported thereby, the moving means being mounted to the base so as to move the ribs of the thoracic portion by movement of the spine support away from and towards the base, the boning apparatus further including drive means for effecting the following operations in sequence: (i) operation of the restaining means to restrain the spine of the thoracic portion against movement relative to the spine support, (ii) movement of the moving means relative to the base so as to engage with the ribs of the thoracic portion in proximity to their free ends remote from the joints of the ribs to the spine, (iii) operation of the moving means to move the free ends of the ribs outwardly in an arc generally about the spine, (iv) movement of the spine support in a direction relatively away from the base so as to dislocate the ribs at the spine or to further separate the spine from the proximate joint ends of the ribs after dislocation.

Preferably the drive means is further operative, after dislocation of the ribs at their joints to the spine and exposure of the joint ends of the ribs, to move the restrained spine relatively away from the exposed joint ends of the ribs so as to progressively peel the tissues remaining attached to the spine away from the ribs.

In the preferred apparatus, the thoracic portion is supported by the apparatus so that the thoracic portion is generally horizontal with the spine being supported and the ribs extending upwardly from the spine so that the moving means is operative to move the ribs outwardly and downwardly.

Possible and preferred features of the present invention will now be described with particular reference to the accompanying drawings. However it is to be understood that the features illustrated in and described with reference to the drawings are not to be construed as limiting on the scope of the invention. In the drawings.

The process and apparatus of the present invention has been particularly developed for use in relation to the separation of the ribs from the carcass or from a section of carcass and the process and apparatus will be further described particularly in relation to the removal of ribs. However the process and apparatus may be applicable to other jointed bones and the invention is not limited to removal of ribs.

The process that will be described in relation to the drawings is preferably carried out on a whole carcass, after the brisket is split, the hide removed and the carcass eviscerated. Also preferably the process is carried out with the carcass in the horizontal position with the spine supported on a horizontal support bed and the ribs extending upwardly.

Figure 1:
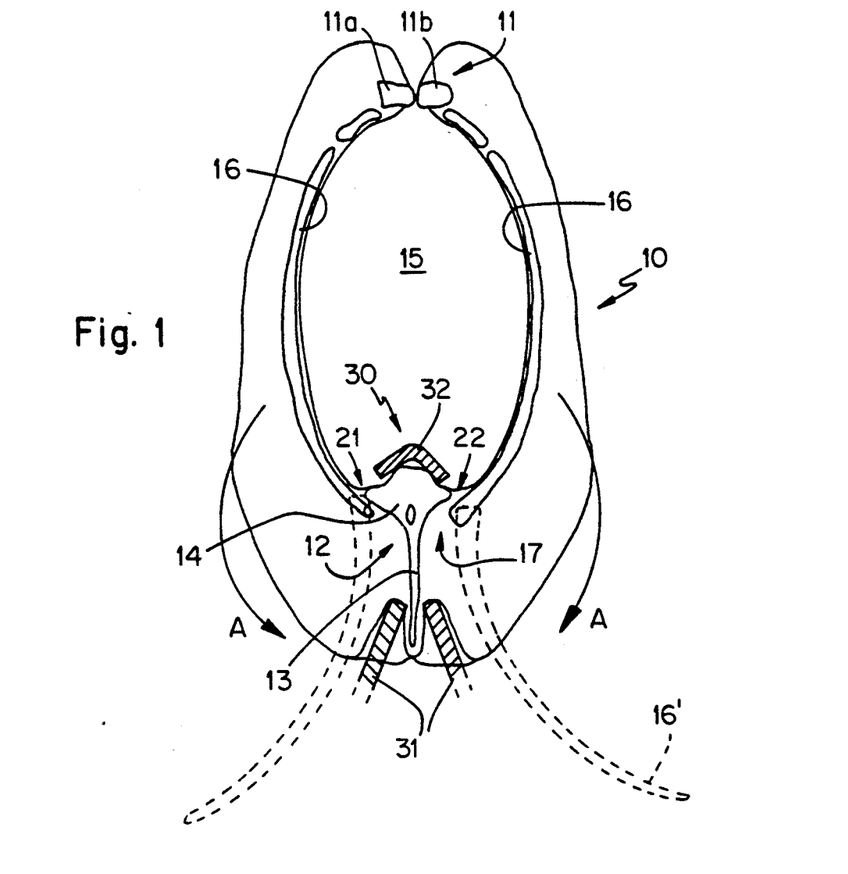
FIG. 1 shows a transverse section of the thorax of a carcass and illustrating the process of the present invention.

Referring to FIG. 1, the thorax 10 is arranged with the sternum or brisket 11 directed upwardly and the spine 12 supported. The spine 12 is restrained by restraining means 30 shown as comprising a dorsal restraint 31 which acts on both sides of the feather bones 13 and generally inwardly towards the vertebra 14. The restraining means 30 also includes a ventral restraint 32 which can be inserted between the two split brisket parts 11a, 11b and located from above or it may project inwardly from the cranial end of the thoracic cavity 15. The dorsal and ventral restraints 31, 32 together clamp and securely restrain the spine 12 against any movement.

The first dislocating movement of the ribs 16 comprises an outwards and downwards pivoting movement of the ribs in the direction of arrows A so that the joint 17 of each rib 16 to the vertebra 14 dislocates as shown in broken line 16' in FIG. 1. The dislocating movement is preferably carried out simultaneously for both left and right sides of the carcass and preferably by moving the entire rib cage on each lateral side outwardly and downwardly in the direction of arrows A so that all of the ribs 16 on both sides of the carcass are dislocated at the spinal column 12. The dislocating movement may be carried out by locating moving means (described later with reference to FIGS. 4 to 7) into position to engage with and to force the ribs 16 outwardly and downwardly about the restraining means. The moving means may be hydraulically actuated or actuated in any other convenient manner.

Figure 2:
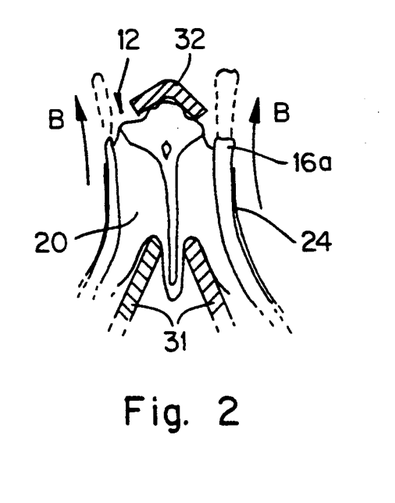
FIG. 2 is a detail of a subsequent stage of the boning process.

As shown in FIG. 2 the inner joint ends 16a of the dislocated ribs 16 are exposed. Dislocation occurs about when the ribs subtend an angle of about 90° at the spine. Exposure of the ends 16a may be achieved by continuing to move the ribs 16 in the direction of arrows A considerably beyond the dislocation point, e.g. to the point where the ribs 16 subtend about 240° at the spine 12. This movement in itself may cause the ends 16a of the ribs to project through the tissues and membranes surrounding the joint region. Additionally, cuts may be made along each side the spine 12, e.g. at points 21, 22 (FIG. 1), to sever connective tissue and reduce the likelihood of ribs breaking during the dislocating movement of the ribs 16. This assists rib exposure.

However, in addition, the exposing step preferably further comprises relatively moving the ribs 16 generally along the lines of the ribs in the direction of arrows B so that the ends 16a adjacent to the vertebra 14 break through the tissues completely as shown in broken line in FIG. 2 and thereby exposing cleanly the ends 16a of the ribs 16. Relative movement of the ribs 16 in the direction of arrows B will cause peeling of the tissues and meat 20 which remain attached to the spine 12 from the ends 16a of the ribs 16.

Figure 3:
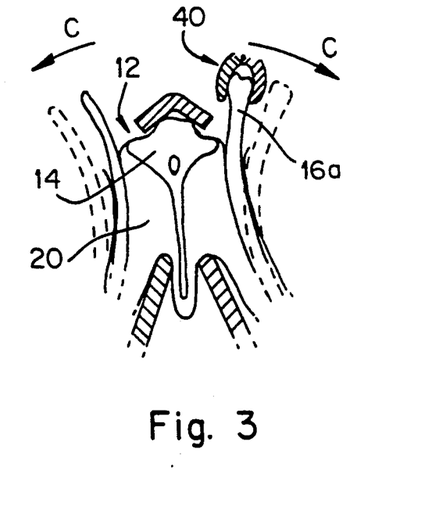
FIG. 3 is a detailed view of a yet later stage of the boning process.

The separating movement of the ribs 16 is illustrated in FIG. 3 as a movement of the exposed ends 16a of the ribs in the direction of arrows C, i.e. in a direction transverse to the general line of each rib. This causes peeling of the ribs away from the tissues and meat 20 remaining attached to the restrained spine 12. In particular, the ribs 16 break through the medial membrane 24 leaving that membrane and the intercostal meat attached to the main body of meat and tissues 20 attached to the vertebra 14 so that the ribs 16 are cleanly extracted without any significant meat or other tissues remaining attached to the ribs. This helps to maximise the recovery of saleable meat from the thoracic part of the carcass.

In FIG. 3, the separating means 40 is illustrated schematically as means which grips the exposed end 16a of each rib and is moved by any convenient means (not shown) in the direction of arrow C. As an alternative to the separting means 40 illustrated schematically in FIG. 3, the separating of the ribs 16 may be achieved by continuing relative movement between the ribs 16 and the spine 12 in the direction of arrows B (FIG. 2). This continued movement in the direction of arrows B may be achieved by moving the dorsal and ventral restraints 31, 32 downwardly so as to move the spine 12 and the attached tissues and meat 20 downwardly in the direction opposite to arrows B thus progressively peeling the tissues and meat 20 away from the ribs 16.

Figure 4:
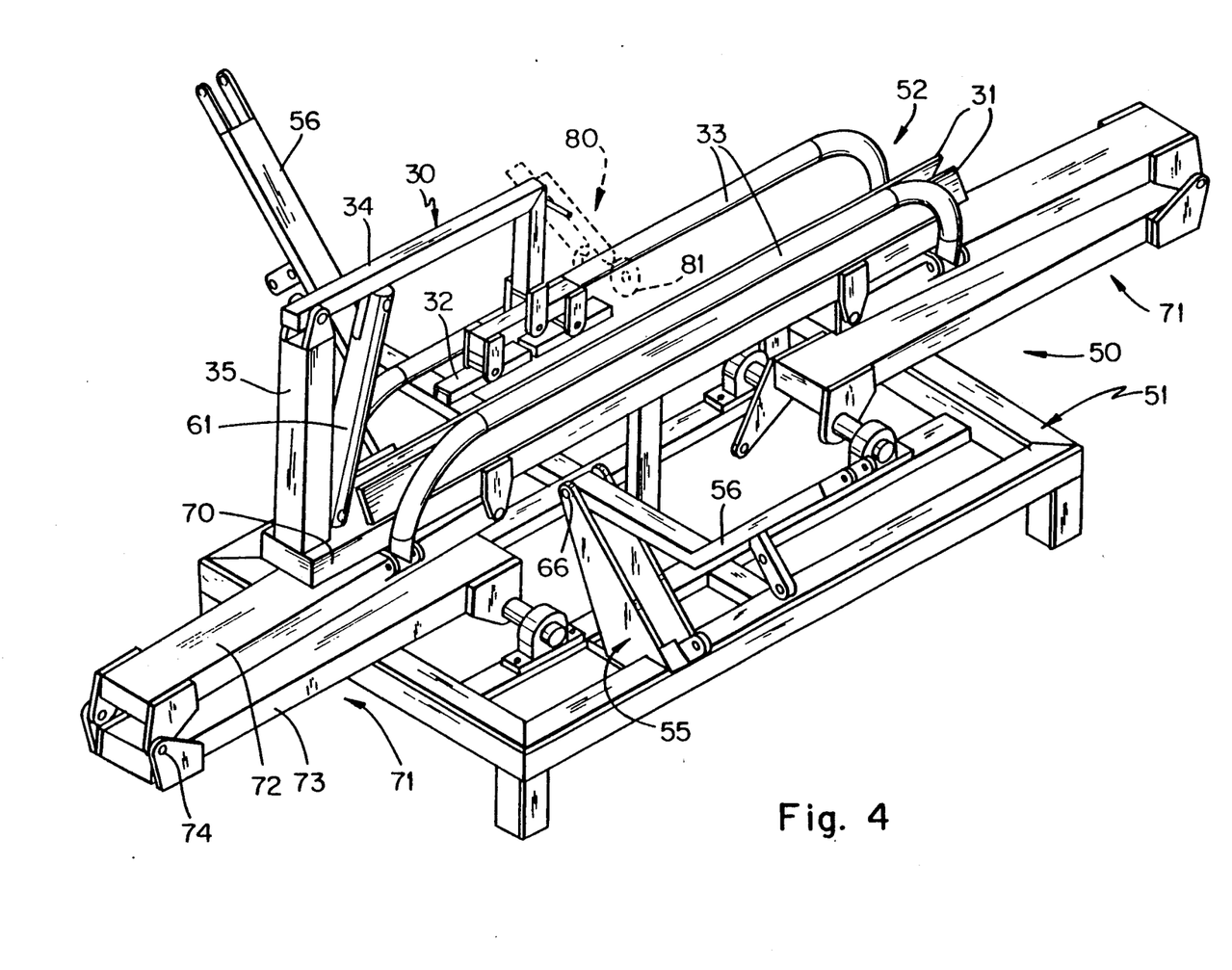
FIG. 4 is a perspective view of a boning apparatus according to the present invention.
Figure 5:
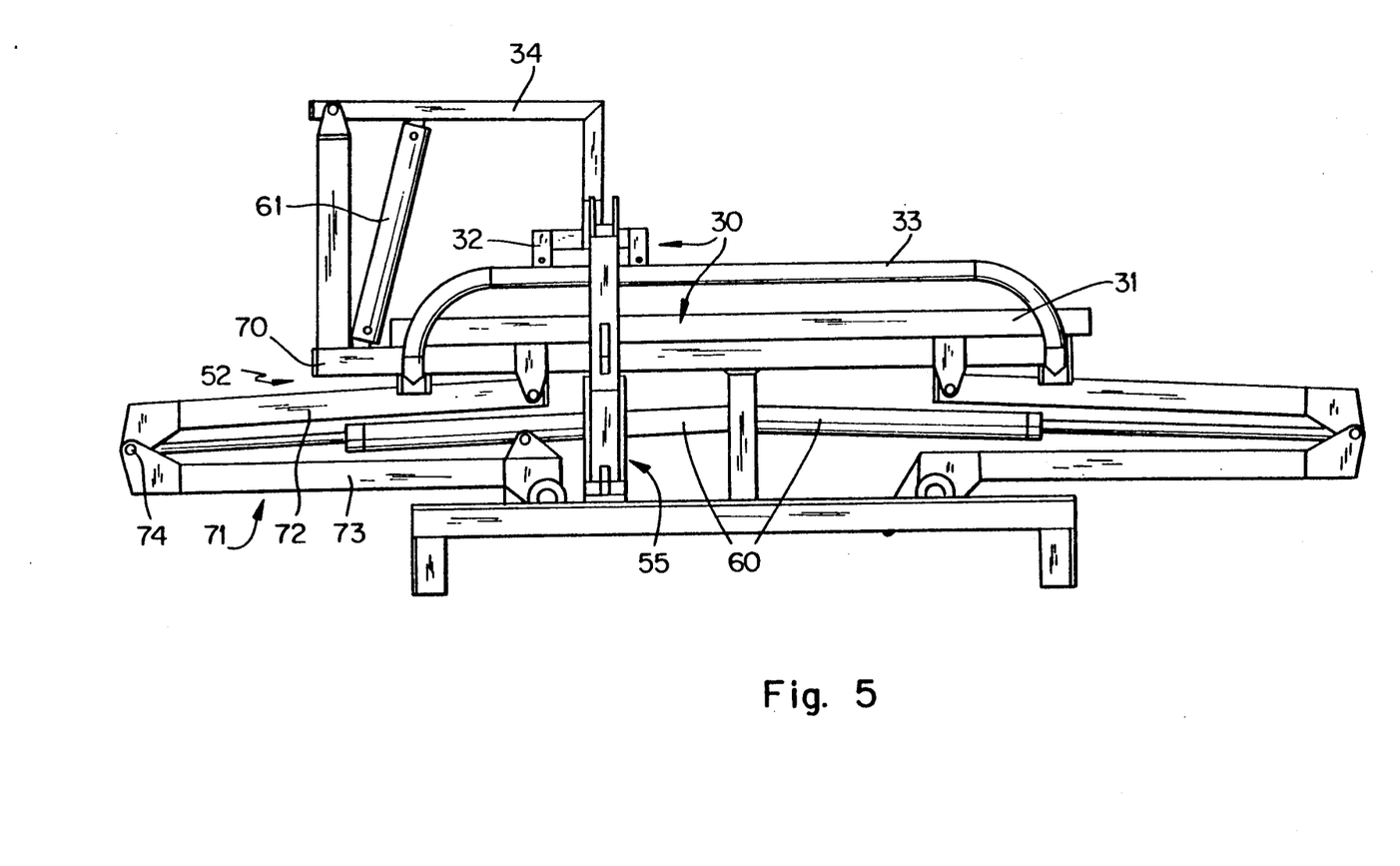
FIG. 5 is a side view of the apparatus of FIG. 4.
Figure 6:
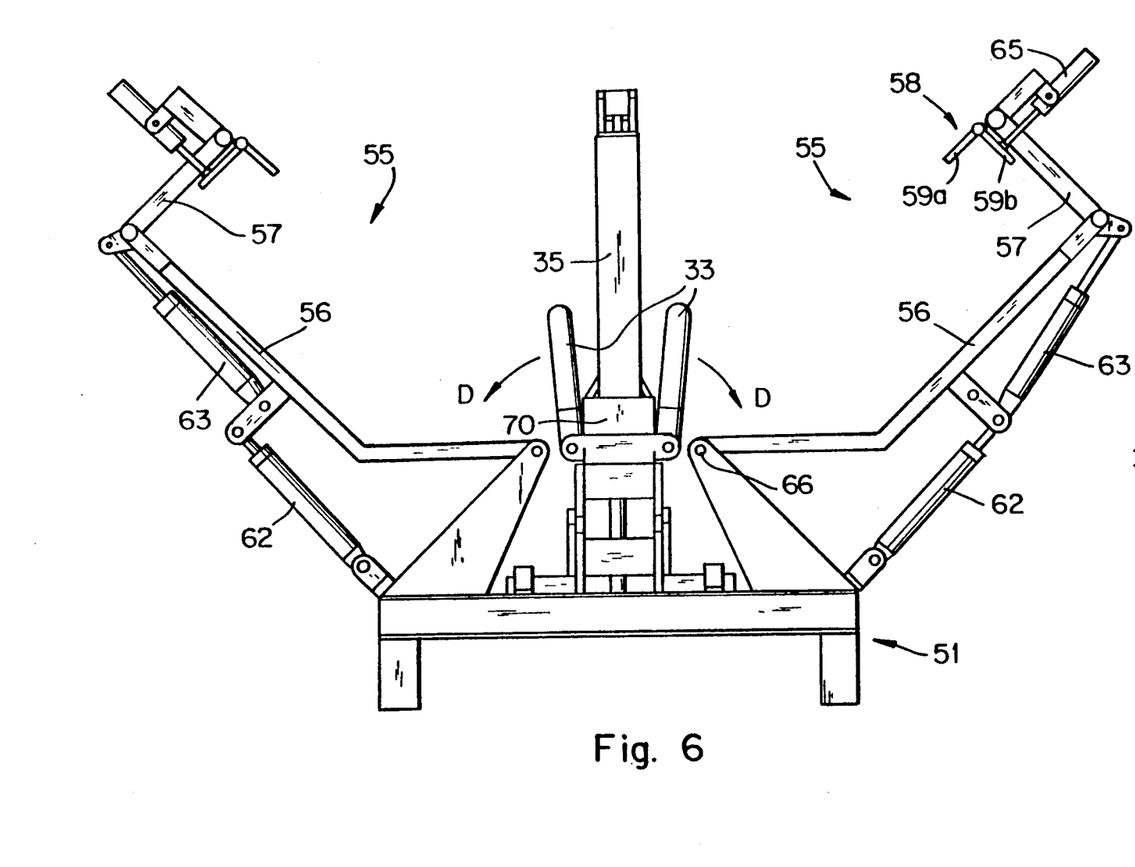
FIG. 6 is an end view of the apparatus of FIG. 4.

The boning apparatus in FIGS. 4 to 6 comprises a support structure 50 for supporting the thoracic portion of a carcass with the spine supported and restrained by the restraining means 30 so that the ribs extend upwardly. The support structure 50 includes a base 51 and a spine support 52 for supporting the thoracic portion of a carcass and being movable towards and away from the base 51. The restraining means 30 is mounted to the spine support 52 so that it continues to restrain the spine during raising and lowering of the spine support 52 relative to the base 51. Also mounted by the base 51 are rib moving means 55, best seen in FIG. 6, which engage with the ribs and assist in the dislocating and separating operations. Drive means comprising rams 61–63 effect the various operations and control means (not shown) such as programmable logic controllers control the sequence of operations. Further details of the apparatus and its operation can be understood from the following description.

When the carcass is first located on the apparatus, it is supported by rails 33. The restaining means 30 comprises inverted V-shaped dorsal restraints 31 operable as described in relation to FIGS. 1 to 3, and ventral restraint 32 shown as a clamp pivoted on the end of arm 34 which in turn is pivoted to post 35 for movement by ram 61. The ventral restraint 32 is moved into position inside the thoracic cavity 15 of the carcass to engage and locate the spine 12 as described earlier. The brisket 11, after being cut, can be separated by any convenient means to allow the ventral restraint 32 to be moved into its operative position.

The rib moving means 55 is not shown in full in FIGS. 4 and 5 but can be seen in full in FIG. 6. The rib moving means 55 comprises rib arms 56 which extend upwardly and around the outside of the thoracic portion. Rib arms 56 are movable by ram 62 to bring the top arms 57 which are pivoted to the rib arms 56 at their upper ends into their general operative positions to engage with the ribs. The top arms 57 are movable by rams 63. At the free ends of the top arms 57 are clamping means 58 comprising opposed clamping jaws 59a, 59b, the jaw 59b being movable by means of ram 65 to engage with the free ends of the ribs 16 at the cut in the brisket 11.

The rails 33 are used to hold the carcass central until the backbone is clamped. The rails 33 can be dropped away from their supporting positions by movement in the direction of arrows D to allow the ribs to be moved outwardly and downwardly about their joints to the spine.

The rams 62 are then driven so as to move the rib arms 56 outwardly and downwardly about pivot axes 66 which are located close to the spine 12. This draws the ribs 16 outwardly and downwardly about their joints 17 to the spine 12. When the general lines of the ribs subtend an angle of about 120° at the spine, the rams 60 (FIG. 5) commence to raise the spine support 52 away from the base 51. This point of raising of the spine support 52 is approximately the position of the rib moving means 55 shown in FIG. 6.

The spine support 52 comprises a frame 70 to which the restraining means 30 comprising the dorsal restraint 31 and the ventral restraint 32 are mounted, together with the rails 33. The frame 70 is movable relative to the base 51 by scissor lift means 71 which couples the frame 70 to the base 51 through pivoted scissor arms 72, 73. The scissor arms 72, 73 are pivoted together at point 74 where the rams 60 are also connected so that operation of the rams 60 draws the pivot points 74 inwardly and thereby raises the frame 70, together with the restraining means 30 and the carcass supported thereby.

As the spine support 52 is raised, the top arms 57 of the rib moving means 55 are allowed to float or move freely to allow the outer free ends of the ribs clamped by the jaws 59a, 59b to continue to move about the joint ends 16a at the spine. As the general lines of the ribs subtend angles approaching and past about 180° at the spine as a result of continued raising of the spine by the spine support 52, the joint ends of the ribs 16 dislocate.

Cutting means 80, illustrated schematically in FIG. 4 in broken line mounted to arm 34, may comprise rotary cutting discs 81 operated at any convenient time in the process up to the point of dislocation. The discs 81 form a cut along each side of the spine where the ribs are jointed to the spine. The cut points are illustrated by the numerals 21, 22 in FIG. 1. The cutting means 80 severs connective tendor between the ribs 16 and the vertebra 14 to prevent or at least reduce the likelihood of ribs breaking during the dislocating movement of the ribs. The formation of the cuts 21, 22 also facilitates emergence of the joint ends 16a of the ribs 16 following dislocation and continued pivoting movement of the ribs. Instead of cutting discs 81, the cutting means may comprise high pressure water jets or other cutting means.

The spine support 52 is raised until the general line of the ribs subtend an angle of about 240° at the spine. By this point, the joint ends 16a of the ribs 16 have all been exposed by emerging through the covering tissues, particularly the medial membrane 24, as illustrated in FIG. 2. At this stage the spine support 52 is stationary and the rib arms 56 are moved further towards each other until they are about vertical. At this point the rib moving means 55 is locked in position including the top arms 57 which had previously been floating and the spine support 52 is lowered again towards the base 51. This has the effect of drawing the spine 12, together with the attached tissues and meat 20 downwardly in a direction opposite to the arrows B in FIG. 2 while the ribs 16 are held against movement. Thus this downward movement of the spine support 52 is equivelent to movement of the ribs upwardly in the direction of arrows B. During the downward movement of the spine support 52, the ribs will progressively emerge as the tissues and meat 20 are pulled downwardly to peel away from the ribs 16. Continued lowering of the spine support 52 to its initial position leaves the clean separated ribs standing up away from the spine and the attached meat and tissues enabling ready complete removal of the ribs with little or no meat attached.

Figure 7:
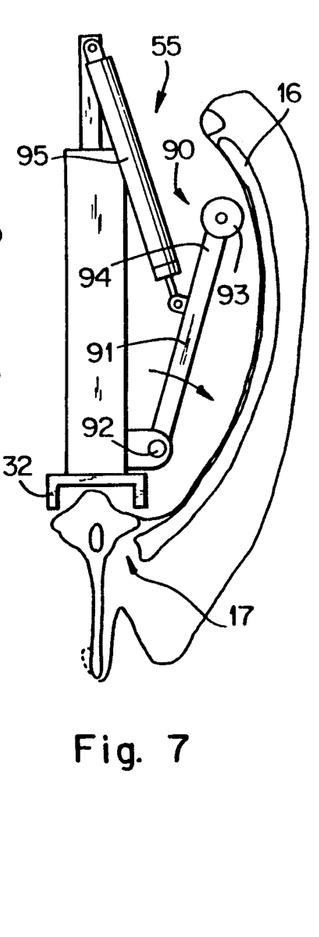
FIG. 7 is an end view of a portion of an alternative apparatus.

A variation of the apparatus shown in FIG. 7 has the rib moving means 55 comprising pushing means 90 arranged to engage with the ribs 16 at the free ends thereof remote from the joint 17 and to push the free ends outwardly so as to move those ends in an arc generally about the joint 17. The pushing means 90 comprises a pushing arm 91 mounted for pivoting movement about a pivot axis 92 near the joint 17. The free end 94 of the pushing arm 91 has contact means 93 for contacting the ribs 16, the contact means 93 forming a rolling contact with the insides of the ribs 16 so that as the pushing arm 91 is moved by ram 95 to push the ribs about the joint 17, the contact means 93 rolls along the inside surfaces of the ribs 16.

Although the boning process and apparatus have been described in detail in relation to removal of ribs from the spine, other jointed or proximate bones may be removed according to the invention. For example, the pelvic bone (with vertebrae remaining attached) has been successfully removed from the femur (thigh bone) by relatively dislocating the two bones at the joint, exposing the proximate portion of the pelvic bone and subsequently separating the pelvic bone from tissues remaining attached to the femur. Also the scapula (shoulder blade) and adjacent vertebrae (which are not jointed but are closely proximate with the end of the scapula near the spine) have been dislocated and exposure of the proximate end of the scapula has enabled clean removal from tissues remaining attached to the spine.

The process and apparatus are particularly suitable for "hot boning" or carcasses, i.e. boning while there is still substantial body heat in the carcass after slaughter. The boning process is preferably carried out within two hours of slaughter and preferably before any forced chilling of the carcass occurs.

It will be seen that the method and apparatus according to the present invention as described herein and illustrated in the drawings can enable recovery of substantially clean bones without attached tissues, thereby enabling the maximum meat to be recovered and the best price for the recovered meat achieved. The process is susceptible to mechanisation and it may be achievable automatically or at least with minimal manual supervision, control and supplementary operations.

We claim:

1. A boning process for separating meat and bone in an animal carcass or in a portion of an animal carcass, the process being characterised by the steps of: restraining a first one (12) of two bones meeting at a joint (17) so that the first bone (12) is restrained relative to the other second one (16) of the two bones; moving the second bone (16) relative to the first bone (12) in a direction (A) so as to dislocate the joint; exposing the second bone (16) at or in close proximity to the dislocated joint; and moving the second bone (16) relative to the restrained first bone (12) to progressively extend the exposed portion (16a) of the second bone (16) along the length of the second bone so as to thereby separate at least a major part of the second bone (16) from tissues (20) remaining attached to the restrained first bone (12).

2. A boning process as claimed in claim 1 characterised in that the step of relatively moving the second bone (16) to dislocate the joint (17) comprises a pivoting movement of the second bone (16) about the joint (17) beyond the normal limit of jointed movement between the two bones.

3. A boning process as claimed in claim 1 characterised in that the step of relatively moving the second bone (16) to dislocate the joint (17) comprises continuing the dislocating movement beyond the point of the dislocation occurring so as to separate the joint end (16a) of the second bone (16) from the region of the joint and facilitate access to the joint end (16a) of the second bone (16) for effecting the step of exposing the second bone at that joint end (16a).

4. A boning process as claimed in claim 1 characterised in that the step of exposing the second bone (16) at the dislocated joint (17) comprises a pivoting movement of the second bone (16) about the joint and in a general plane of the movement until the joint end (16a) of the second bone (16) at the dislocated joint (17) emerges through the adjacent tissues to thereby expose that joint end (16a) of the second bone.

5. A boning process as claimed in claim 4 characterised in that the step of exposing the joint end (16a) of the second bone (16) includes relatively moving the second bone (16) in a general linear movement along the general line (B) of the second bone (16), the linear movement being effected after dislocation of the joint (17), the linear movement moving the joint end (16a) of the second bone (16) past the restrained first bone (12) to thereby cause the joint end (16a) of the second bone (16) to emerge through the adjacent tissues.

6. A boning process as claimed in claim 1 characterised in that the step of exposing the second bone (16) comprises forming at least one cut (21, 22) in the connective tendor between the second bone (12) the first bone (12) so as to thereby expose or assist in the exposing of the second bone (16).

7. A boning process as claimed in claim 1 characterised in that the step of separating the second bone (16) comprises relatively moving the exposed end (16a) of the second bone (16) away from the dislocated joint (17) so as to thereby cause progressive separation of the second bone (16) from the tissues (20) remaining attached to the first bone, the progressive separation commencing from the exposed end (16a) of the second bone.

8. A boning process as claimed in claim 5 characterised in that the step of separating the second bone (16) comprises continuing to relatively move the second bone (16) generally linearly along the general line (B) of the second bone so as to progressively separate the second bone (16) from the tissues (20) remaining attached to the restrained first bone (12).

9. A boning process as claimed in claim 8 characterised in that the step of separating the second bone (16) comprises relatively pushing the second bone (16) past the dislocated joint (17) so that the tissues (20) remaining attached to the restrained first bone (12) progressively peel away from the second bone (16) at it is moved.

10. A boning process as claimed in claim 1 characterised in that the step of separating the second bone (16) comprises relatively pulling the second bone (16) at the exposed end (16a) thereof away from the restrained first bone (12) in a direction (C) transverse to the general line of the second bone.

11. A boning process as claimed in claim 10 characterised in that the step of separating the second bone (16) comprises gripping the exposed end (16a) of the second bone (16) and subsequently relatively moving the gripped end (16a) away from the restrained first bone (12) so as to cause a peeling of the tissues (20) remaining attached to the first bone away from the second bone (16).

12. A boning process as claimed in claim 1 characterised in the process is arranged for separating ribs (16) from the spine (12) at the thoracic portion (10) of an animal carcass or a portion of an animal carcass, the thoracic portion (10) having been processed so that the brisket (11) has been split, the hide removed and at least the thoracic portion eviscerated, the thoracic portion (10) including both left and right side sets of ribs; the step of restraining comprising restraining the spine (12) of the thoracic portion (10), the step of moving comprising engaging and moving the ribs (16) at both sides of the carcass portion outwardly and generally in an arc about the restrained spine (12) to dislocate the joints (17) where the ribs (16) connect to the spine (12).

13. A boning apparatus for use in separating bones from animal carcasses or portions of animal carcasses, the apparatus comprising: restraining means (30) for restraining a first one (12) of two bones meeting at a joint (17) so that the first bone (12) is restrained relative to the other second one (16) of the two bones; moving means (55) for moving the second bone (16) relative to the first bone (12) in a direction (A) so as to dislocate the joint (17); the second bone (16) being exposed at or in close proximity to the dislocated joint (17), and the moving means (55) being operative to move the second bone (16) relative to the restrained first bone (12) to progressively extend the exposed portion (16a) of the second bone (16) along the length of the second bone so as to thereby separate at least a major part of the second bone (16) from tissues (20) remaining attached to the restrained first bone (12).

14. A boning apparatus as claimed in claim 13 characterised in that the moving means (55) is operative to move the second bone (16) with a pivoting movement about the joint (17) beyond the normal limit of jointed movement so as to dislocate the joint (17).

15. A boning apparatus as claimed in claim 14 characterised in that the moving means (55) includes engaging means (58, 90) for engaging the second bone (16) at a free end thereof remote from the joint (17), the engaging means (58, 90) being operative to move the free end in an arc (A) generally about the joint.

16. A boning apparatus as claimed in claim 15 characterised in that the engaging means comprises clamping means (58) having clamping jaws (59a, 59b) which are movable relatively towards and away from each other so as to selectively clamp the free end of the second bone (16), the clamping means (58) being movably mounted so as to move the free end of the second bone in an arc (A) generally about the joint (17).

17. A boning apparatus as claimed in claim 14 characterised in that the moving means comprises pushing means (90), the pushing means being arranged to engage with the tissues and/or second bone (16) at a free end thereof remote from the joint (17) and to push the free end so as to move that end in an arc (A) generally about the joint (17).

18. A boning apparatus as claimed in claim 17 characterised in that the pushing means (90) comprises a pushing arm (91) mounted for pivoting movement about a pivot axis (92) which in use is located in the general vicinity of the joint (17), the free end (94) of the pushing arm (91) having contact means (93) for contacting the tissues and/or second bone (16) at the free end thereof, the contact means (93) forming a rolling contact with the tissues and/or bone (16) so that as the pushing arm (91) is moved to push the second bone about the joint, the contact means (93) rolls along the surface of the tissues and/or second bone (16).

19. A boning apparatus as claimed in claim 13 characterised by a cutting means (80) operative prior to or during the dislocating movement to form a cut (21, 22) in the connective tendor between the second bone and the first bone so as to thereby expose or assist in the exposing of the second bone (16).

20. A boning apparatus as claimed in claim 13 characterised in that the apparatus is arranged for separating ribs (16) constituting the second bones from the spine (12) constituting the first bone at a thoracic portion (10) of an animal carcass or a portion of an animal carcass, the thoracic portion (10) having been processed so that the brisket (11) has a longitudinal cut, the hide removed and at least the thoracic portion (10) eviscerated, the thoracic portion (10) including both left and right side sets of ribs (16) and the restraining means (30) being operative to restrain the spine (12) of the thoracic portion, the moving means (55) being operative to move the ribs (16) at both sides of the thoracic portion outwardly and generally in an arc (A) about the restrained spine (12).

21. A boning apparatus as claimed in claim 20 characterised in that the moving means (55) is operative to move all ribs on both sides of the thoracic portion (10) simultaneously.

22. A boning apparatus as claimed in claim 20 characterised in that the restraining means (30) operative to restrain the spine (16) of the thoracic portion (10) comprises a dorsal restraint (31) to engage and locate against movement the dorsal side of the spine (12) and a ventral restraint (32) to engage and clamp the spine (12) so that the dorsal and ventral restraints (31, 32) together restrain the spine against movement during the boning operation.

23. A boning apparatus as claimed in claim 22 characterised in that the dorsal restraint (31) is operative to engage with the spine (12) on both sides of the feather bones (13) along the dorsal side of the spine and to apply restraining force acting from both sides of the feather bones (13) and generally towards the vertebra (14).

24. A boning apparatus as claimed in claim 19 characterised in that the apparatus includes a support structure (50) for supporting the thoracic portion (10), the support structure (50) having the restraining means (30) mounted thereto so that the restraining means is operative to restrain the spine (12) of the thoracic portion (10) against movement relative to the support structure (50), the support structure (50) including a base (51) and a spine support (52) for supporting the thoracic portion and being movable towards and away from the base (51), the restraining means (30) being mounted to the spine support (52) so as to be movable together with the spine support (52) and the thoracic portion (10) supported thereby, the moving means (55) being mounted to the base (51) so as to move the ribs (16) of the thoracic portion (10) by movement of the spine support (52) away from and towards the base (51), the boning apparatus further including drive means (60-63) for effecting the following operations in sequence: (i) operation of the restraining means (30) to restrain the spine (12) of the thoracic portion (10) against movement relative to the spine support (52), (ii) movement of the moving means (55) relative to the base (51) so as to engage with the ribs (16) of the thoracic portion in proximity to their free ends remote from the joints (17) of the ribs (16) to the spine (12), (iii) operation of the moving means (55) to move the free ends of the ribs (16) outwardly in an arc (A) generally about the spine (12), (iv) movement of the spine support (52) in a direction relatively away from the base (51) so as to dislocate the ribs (16) at the spine (12) or to further separate the spine from the proximate joint ends (16a) of the ribs (16) after dislocation.

25. A boning apparatus as claimed in claim 24 characterised in that the drive means (60-63) is further operative, after dislocation of the ribs (16) at their joints (17) to the spine (12) and exposure of the joint ends (16a) of the ribs, to move the restrained spine (12) relatively down away from the exposed joint ends (16a) of the ribs (16) so as to progressively peel the tissues (20) remaining attached to the spine (12) away from the ribs.

26. A boning apparatus claimed in claim 20 characterised in that the thoracic portion (10) is supported by the apparatus so that the thoracic portion (10) is generally horizontal with the spine (12) being supported and the ribs (16) extending upwardly from the spine so that the moving means (55) is operative to move the ribs (16) outwardly and downwardly.

* * * * *